J. H. CLARK.
WHEEL.
APPLICATION FILED JULY 9, 1913.
1,120,027.
Patented Dec. 8, 1914.
2 SHEETS—SHEET 1.
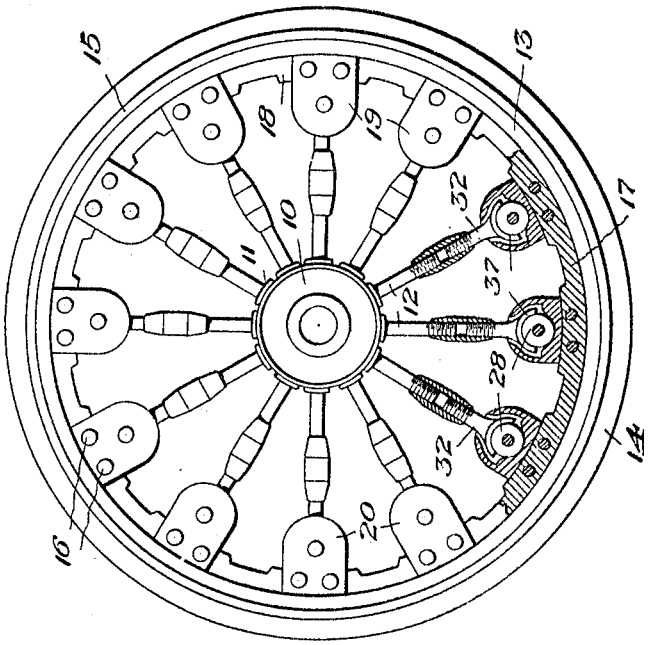
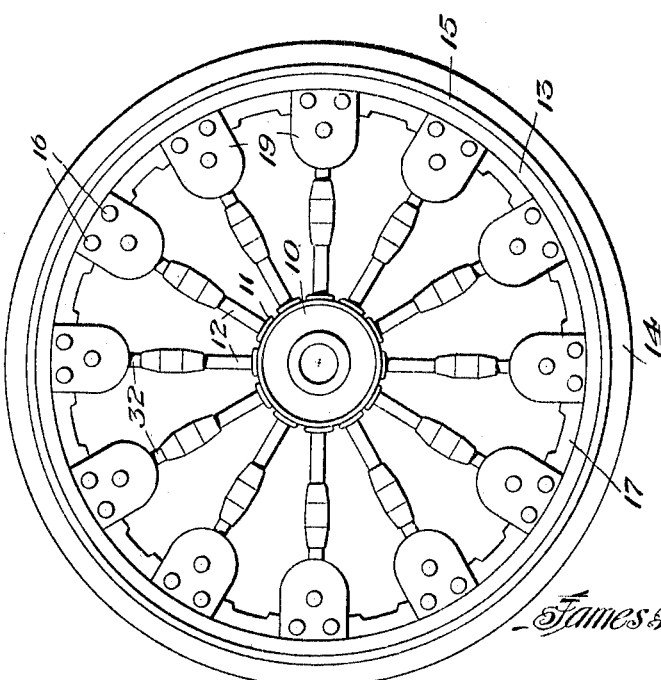
Witnesses
Wm C Dashiell
J. W. Michaels
Inventor
James H. Clark
By Edson Bros.
Attorneys

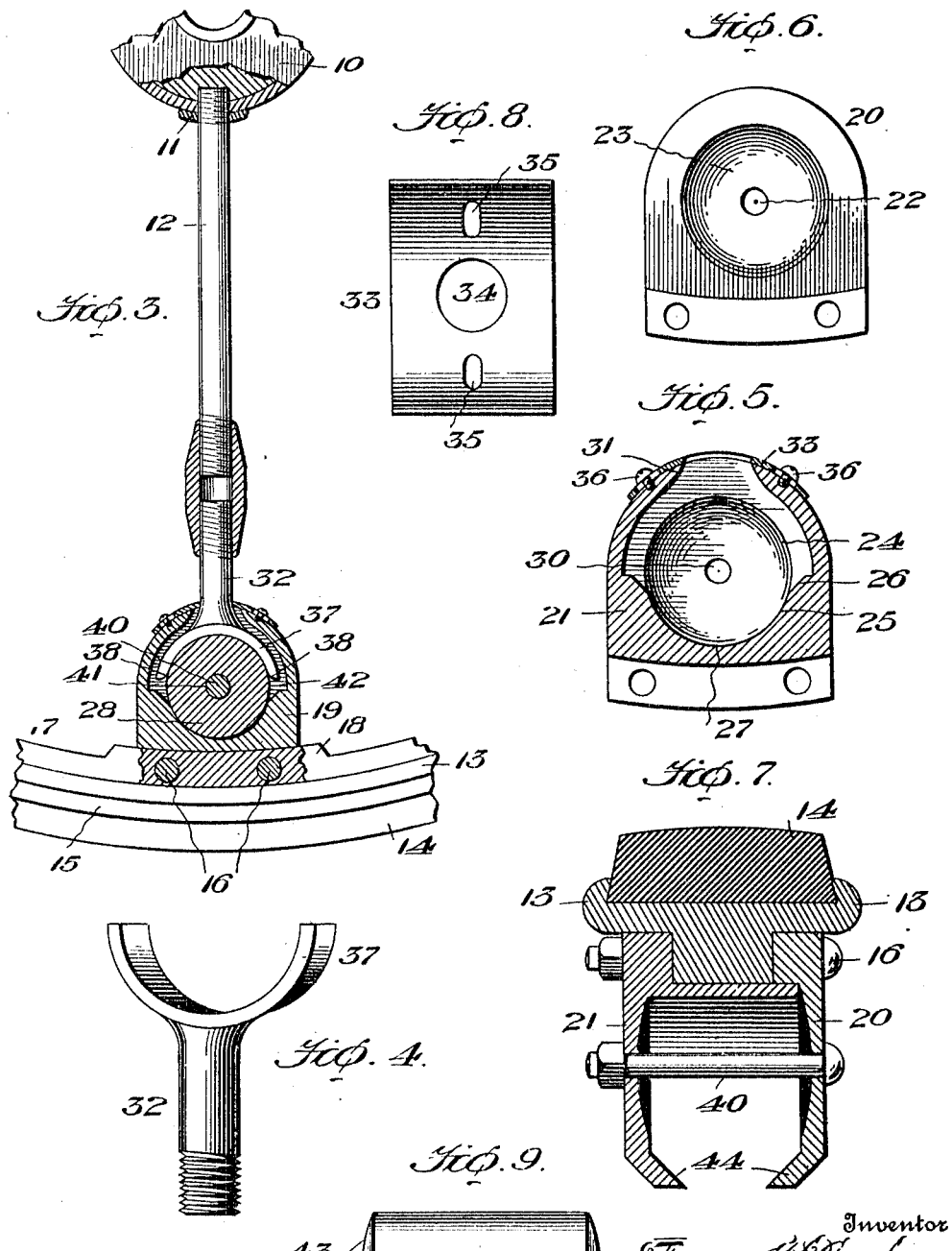

UNITED STATES PATENT OFFICE.

JAMES H. CLARK, OF ST. JOHNS, OREGON, ASSIGNOR OF ONE-HALF TO JESSE M. RUSSELL, OF ST. JOHNS, OREGON.

WHEEL.

1,120,027. Specification of Letters Patent. Patented Dec. 8, 1914.

Application filed July 9, 1913. Serial No. 778,146.

*To all whom it may concern:*

Be it known that I, JAMES H. CLARK, a citizen of the United States, residing at St. Johns, in the county of Multnomah and State of Oregon, have invented certain new and useful Improvements in Wheels; and I do hereby declare the following to be a full, clear, and exact description of the invention, such as will enable others skilled in the art to which it appertains to make and use the same.

This invention is a wheel adapted more particularly for use on motor vehicles, and the like, having for its object to produce superior traction or road gripping qualities, as well as possessing a yieldable cushioning effect, the combination of elements taking the place of a wheel provided with an ordinary pneumatic tire.

Further purposes of the invention are to increase the strength of the wheel; render the moving parts thereof noiseless in action; reduce the cost and maintenance of motor vehicle wheels and tires by preventing the liability of damage to pneumatic tires, or pneumatic substitutes for tires or other fragile resilient devices, and to increase the safety of travel by motor vehicles by providing the same with wheels which will withstand greater strain of travel, especially under speed conditions.

With the foregoing and other objects in view, the invention resides in the novel construction, arrangement and combination of parts which will be hereinafter described, and more particularly pointed out in the appended claims.

One embodiment of the invention is illustrated in the accompanying drawings, in which—

Figure 1 is a side elevation of a wheel. Fig. 2 is a side elevation of a wheel, parts being in section. Fig. 3 is an enlarged detail sectional view through a spoke showing its attachment to a rim. Fig. 4 is a detail view of an end of a spoke. Fig. 5 is a sectional view through one of the spoke seats. Fig. 6 is a front elevation of an end plate of the spoke seat. Fig. 7 is an enlarged sectional view through a portion of the tire, rim, and spoke seat. Fig. 8 is a bottom plan view of a retaining dust plate, and Fig. 9 is a detail view of one of the resilient members.

The invention comprises an ordinary rim and hub section of a wheel, to the rim of which is suitably secured a solid tire, preferably of rubber, which is suitably clamped in position. Secured to the rim are a series of complemental plates so arranged that they form spoke seats between each pair of plates, and a resilient or cushion member is suitably secured within the spoke seats. Each spoke is made into a plurality of sections, one section being secured to the hub, while the other section is provided with a shoe or forked end, which is adapted to ride upon the resilient member. The forked end of the spoke is suitably secured within the spoke seat to prevent undue lateral movement of the spoke with reference to the wheel rim. Means are provided, also, for adjusting the length of the spoke and determining the degree of compression to be exerted upon the resilient members carried by the spoke seats.

In the preferred embodiment of the invention, illustrated in the accompanying drawing, the hub is indicated at 10, and is shown provided with a series of threaded collars 11 for receiving one end of the inner section of a series of spokes 12. The rim 13 is provided with a tire 14, preferably of solid rubber, which is so constructed that it may be clamped upon the rim. The rim, shown in Fig. 7, is provided with suitable retaining flanges 15 for holding the tire in position, said clamping arms being tightened around the tire by a suitable bolt 16. The rim 13 is provided, also, with a circumferential flange 17, shown as provided with extended surfaces 18 to afford greater bearing surface for the plurality of connecting bolts 16.

Secured to each side of the flange 17, preferably at the points where the sections 18 are provided, are complemental socket members forming spoke seats 19. These seats are provided with the plates 20 and 21 which are suitably bolted to the flange 17 by means of the bolts 16. By reference to Fig. 6, it will be observed that the plate 20 is provided with a substantially central aperture 22, and also with a concave face 23, the purpose of which will be hereinafter disclosed. Section 21 of the spoke seat is shown provided with a suitable chamber 24 having a flanged lower member 25, the edge of which is preferably beveled, as shown at 26. The lower end of this chamber 27 is shown arcuate in form to serve as a seat for a suitable resilient member 28, shown more particularly in Fig. 9. Section 21 is provided, also, with an aperture 30 corresponding with the aperture 22 of section 20. The upper walls of the chamber 24 are preferably of greater diameter than the lower section thereof, and these upper walls are provided with a vertical central opening 31 for the reception of the end of the outer spoke member 32. Each inner spoke section 12 and outer spoke member 32 may be connected by any suitable means, such as a turn-buckle 12$^a$ shown in Figs. 1, 2 and 3 of the drawings. This upper opening 31 is adapted to be closed by a suitable plate 33, shown more particularly in Fig. 8, said plate having a large aperture 34 and a series of smaller apertures 35. The plate is of a form to correspond to and fit over the top of the parts 20 and 21, and in the drawings this plate is shown as arcuate in form and adapted to be secured to the member 21 by suitable bolts or screws 36. The outer section or member 32 of each of the spokes is flared outwardly to provide arms 37, said arms being shown in Figs. 3 and 4 as arcuate in form and having a rounded bearing surface which is adapted to rest against the resilient member 28 secured within the spoke seat. The ends of each of these arms 37 are preferably cut away, at 38, to correspond with the cut away portion 25 in the member 21, whereby when the resilient member 28 is placed under compression by the action of the spokes of the wheel bearing the load of the vehicle, said member may be expanded outwardly between the ends 38 of the arms 37, and the end 25 of member 21, without cutting or otherwise unduly marring the member 28. Moreover, it is preferable to secure the member 28 in operative position in alinement with the radial movement of the spoke by a bolt 40, thereby permitting the member 28 to rotate within the spoke seat when pressure is released from said member, thus permitting a different bearing surface to be presented to the end 32 of the spoke. When greater resiliency is desired to the wheel, the aperture 41, formed in member 28, may be made of greater diameter, thereby permitting greater compression of the member 28. Besides the expansion of member 28 into the space 42 between the ends 25 and 38 of the spoke seats, the ends 43 of member 28 may be expanded into the concave portions 23 of sections 20 and 21 of the spoke seats. It will, therefore, be observed that this resilient member 28, when compressed by the action of the spoke 32 against the seat 27, may be expanded at the sides and ends into the sections 23 and 42. These sections 20 and 21 may be provided, also, with inwardly extended top flanges 44 operating to retain the member 28 in position within the chamber, if found desirable.

While I am aware that various modifications and changes may be made in the device, the right is reserved to make such changes and alterations therein as may fairly fall within the scope of the appended claims.

Having thus fully described my invention, what I claim as new and desire to secure by Letters Patent is:—

1. In a wheel, the combination with a felly and a plurality of coöperating members secured thereto to produce spoke chambers, of spokes having yoke arms adapted to be loosely confined in said spoke chambers, and a cylindrical cushion element capable of rotative movement confined in each of said chambers and adapted to be engaged by said yoke arms of the spokes to permit of radial movement and oscillating movement of the spokes in said chambers, said oscillating movement being in the direction of rotative movement of the wheel.

2. In a wheel, the combination with a felly and the spokes, of a spoke-seat comprising a plurality of coöperating members secured to the felly to produce a chamber, a substantially cylindrical cushion-element confined in said chamber between said coöperating members and capable of rotative movement, and means to lock said coöperating members to the felly.

3. In a wheel, the combination with a felly, of a plurality of spokes each including a plurality of sections, adjustable means connecting said sections, one of said sections terminating in a forked-end, a spoke-seat comprising a plurality of coöperating members adapted to be secured to said felly and to produce a chamber between said members, a solid cushion-element retained within said chamber, the forked end of said spokes being secured within the said chamber and in contact with said cushion-element and a plate to close said chamber.

4. A wheel comprising a felly, and a plurality of sectional spokes, adjustable means to connect such spoke sections, one of said spoke sections terminating in a forked-end and having tapered points, a spoke-seat adapted to be secured to the felly of the wheel, each spoke-seat comprising complemental sections and producing a chamber between them, a part of said chamber being arcuate in cross section, the edge of the wall of said chamber terminating in a bevel, and a solid cushion-element retained within said chamber and adapted to be engaged by the forked-end of the spokes, whereby upon compression of said cushion-element it may be expanded between the tapered part of the forked-end of the spoke and the beveled part of the chamber wheel.

5. In a wheel of the class described including a felly, a spoke-seat comprising a plurality of complemental members, one of said members having an inturned flange at one edge thereof to engage the felly, and an inclined flange at the other edge thereof, the other of said members having a felly engaging-flange, an inturned-flange, and a base-plate which is adapted to engage the inner face of the other complemental-member, the inner surfaces of said complemental-members forming a chamber to receive a cushion-element, and means to lock said plates to the wheel felly.

6. In a wheel of the class described, including a felly having an up-standing flange, a plurality of spoke-seats adapted to be secured to the felly, each spoke-seat comprising a plurality of complemental plates, one of said plates having a depending member adapted to engage the side of said felly-flange, and a base-plate integral therewith adapted to rest upon said felly flange, a part of said complemental plate having a flange adapted to engage said felly-flange, said latter plate adapted to abut against a portion of said first named complemental plate, retaining means adapted to pass through the felly flange and said complemental plates, and means to secure a cushion-element between said complemental-plates.

7. A wheel including a felly and a plurality of spokes, each spoke terminating in a forked-end, spoke-seats adapted to be secured adjacent said end, each spoke-seat comprising a plurality of coöperating plates, one of said plates having a base-member provided with an arcuate channel, said coöperating members of the spoke-seat forming a chamber between them with an open upper end, a cushion-element of less area than the chamber of said spoke-seat adapted to be engaged by the forked-end of said spokes, and a plate adapted to surround the end of said spokes and close the open end of said chamber to lock the cushion-element and spoke within said chamber.

8. A wheel comprising a hub, a rim provided with a series of spoke seats, a series of spokes each comprising a plurality of sections, one section of each spoke being secured to the hub, and another section having a forked end terminating within a spoke seat, a resilient member provided with a substantially central core adapted to be positioned within said spoke seats, and means for retaining said resilient member in said spoke seats to permit rotary movement of the resilient member.

In testimony whereof, I affix my signature, in presence of two witnesses.

JAMES H. CLARK.

Witnesses:
C. B. RUSSELL,
J. M. RUSSELL.

Copies of this patent may be obtained for five cents each, by addressing the "Commissioner of Patents, Washington, D. C."